United States Patent [19]

Maruyama et al.

[11] Patent Number: 5,557,433
[45] Date of Patent: Sep. 17, 1996

[54] TRANSMISSIVE LIQUID CRYSTAL DISPLAY HAVING PRISM LENS FILM FOR LIGHT ILLUMINATION AND WAVE LENS FILM FOR LIGHT DIFFUSION

[75] Inventors: Muneo Maruyama; Toshihiko Ueno; Hiroshi Hada; Masatake Baba, all of Tokyo, Japan

[73] Assignee: NEC Corporation, France

[21] Appl. No.: 387,606

[22] Filed: Feb. 13, 1995

[30] Foreign Application Priority Data

Feb. 28, 1994 [JP] Japan ............................ 6-030655

[51] Int. Cl.⁶ .................................. G02F 1/1335
[52] U.S. Cl. ................................ 359/41; 359/69
[58] Field of Search ............... 359/40, 41, 69, 359/74, 51, 48

[56] References Cited

U.S. PATENT DOCUMENTS

| | | | |
|---|---|---|---|
| 4,505,547 | 3/1985 | Sekimura | 359/74 |
| 4,529,272 | 7/1985 | Kruger | 359/74 |
| 4,556,288 | 12/1985 | Sekimura | 359/74 |
| 4,626,074 | 12/1986 | Crossland | 359/50 |
| 4,708,439 | 11/1987 | Ishii | 359/64 |
| 5,103,326 | 4/1992 | Fergason | 359/51 |
| 5,161,041 | 11/1992 | Abileah | 359/40 |
| 5,398,125 | 3/1995 | Willett | 359/40 |

FOREIGN PATENT DOCUMENTS

| | | | |
|---|---|---|---|
| 284371 | 12/1986 | Japan. | |
| 299943 | 12/1987 | Japan. | |
| 118518 | 5/1990 | Japan. | |
| 3253819 | 11/1991 | Japan | 359/69 |
| 6148433 | 5/1994 | Japan | 359/69 |
| 6194648 | 7/1994 | Japan | 359/69 |
| 2119110 | 11/1983 | United Kingdom | 359/74 |

*Primary Examiner*—Anita Pellman Gross
*Assistant Examiner*—Tiep H. Nguyen
*Attorney, Agent, or Firm*—Hayes, Soloway, Hennessey, Grossman & Hage

[57] ABSTRACT

In a TN LCD, a prism lens film and a wave lens film are disposed on the incoming and outgoing sides of a liquid crystal panel, respectively, to obtain an image wide in visual angle and good in its quality. Thus, outgoing light having a sharp directivity, can be obtained from light emitted from a surface illuminant and having a gradually varying directional property by the prism lens film. Further, with a louver film provided in front of the prism lens film, all the light traveling in the diagonal direction can be cut off so that substantially parallel light enter the liquid crystal panel. Since the light in which a variation in retardation is next to nothing, is diffused by the wave lens film, a wide visual-angle representation free of a dependence on the visual angle can be obtained. In order to prevent the image from being turned white due to the reflection of external light and obtain an image of satisfactory quality, which is high in contrast ratio, the front surface of the wave lens film is coated with a multilayer film. Further, both surfaces of the liquid crystal panel and the wave lens film, which are opposed to each other, are coated with multilayer films. Furthermore, an improvement in performance can be carried out by providing a louver film between the prism lens film and the liquid crystal panel.

12 Claims, 9 Drawing Sheets

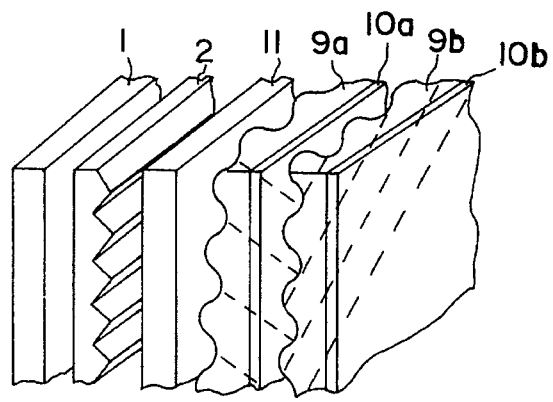
F I G. 11
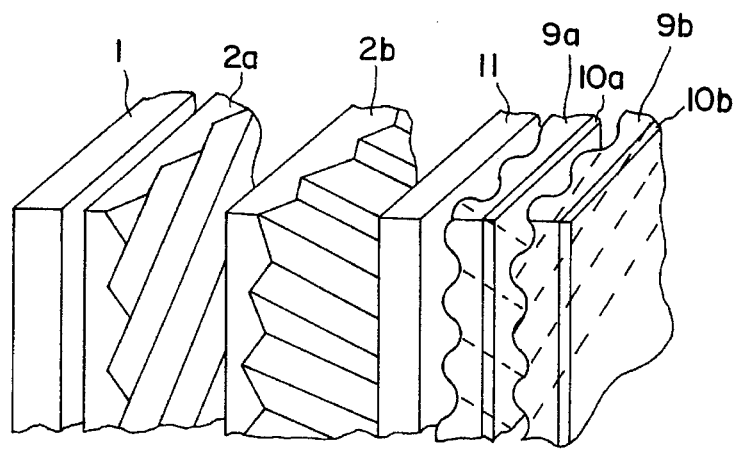
F I G. 12
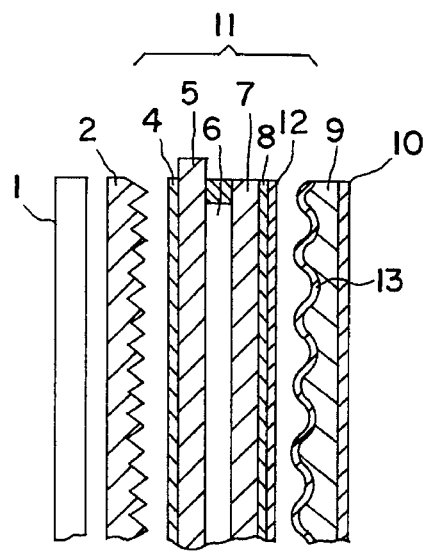
F I G. 13

TRANSMISSIVE LIQUID CRYSTAL DISPLAY HAVING PRISM LENS FILM FOR LIGHT ILLUMINATION AND WAVE LENS FILM FOR LIGHT DIFFUSION

BACKGROUND OF THE INVENTION

1. Field of the Invention

The present invention relates to a transmissive liquid crystal display (hereafter called LCD), and particularly to a transmissive LCD having a wide visual angle.

2. Description of the Related Art

As shown in FIG. 1, liquid crystal panel 11 of a conventional normally white type transmissive LCD comprises active matrix substrate 5, color filter substrate 7 formed with a transparent common electrode and a color filter, TN (Twisted Nematic) liquid crystal 6 being impregnated between both substrates 5 and 7, and polarizing plates 4 and 8 which are formed on the outer surfaces of both substrates 5 and 7, respectively, with their axes of polarization inclined 90° to each other. Light emitted from surface illuminant 1 is modulated so as to display a predetermined character or an image. In this TN type LCD, retardation of the incident light varies depending on the incident angle deviating from the normal to liquid crystal panel 11 due to double refraction of the liquid crystal and the quality of its representation greatly depends on the visual angle of the device. On the other hand, a remedy for allowing incident light to fall only in the vertical direction onto liquid crystal panel 11 so as to make retardation constant and diffusing light transmitted through liquid crystal panel 11 has been considered in order to widen the visual angle. Such prior art will hereinafter be described by the following seven examples.

Japanese Patent Laid-Open No. 118518/90 discloses several prior arts: a first prior art in which, as shown in FIG. 2, light applied to LCD cell from light source 101a is made parallel by spherical mirror 101b and lens 101c and the light transmitted through TN type liquid crystal layer 106, is diffused by light diffusion layer 109 made of a transparent body or the like added with scattering particles, and a second prior art in which, as shown in FIG. 3, light emitted from light source 101 is made parallel by using light waveguide 103 of a honeycomb construction having an high optical density to thereby prevent the reflection of light and the parallelized light is allowed to enter liquid crystal panel 111 with a light diffusion function. However, when spherical mirror 101b and lens 101c are used in the first prior art, the LCD is made thicker. Further, a principal portion of the incident light enters at a substantially right angle to the LCD cell on the entry side of the liquid crystal panel, but diagonally entering light is not fully cut off. In the second prior art, since light waveguide 103 is internally brought to high optical density so as to prevent light from reflection, the diagonal incident light is completely cut off, thereby causing a significant reduction in the quantity of light. Although liquid crystal panel 111 is provided with a light diffusion layer or a color filter having light diffusion function to thereby improve image blur and variation in color tone, a loss of light that goes out from a liquid crystal layer and the reflection of external light take place. According to a third prior art, color filters 120 and 121 formed in two layers are used so as to control or restrain light traveling in the diagonal direction as shown in FIGS. 4(a) and 4(b). Further, according to a fourth prior art, even if a reflected component of external light is reduced by gray filter 114, light emitted from the liquid panel is also reduced simultaneously as shown in FIG. 5. According to a fifth prior art, the reflection of the external light by display pixels cannot be avoided even if black matrix 115 is provided as shown in FIG. 6.

Japanese Patent Laid-Open No. 284731/86 discloses a sixth prior art in which, as shown in FIG. 7, collimator 203 is provided between a light source and plate glass 205 of a liquid crystal panel so that incident light on the liquid crystal panel is substantially parallelized, and the outgoing light modulated by the liquid crystal panel is diffused by microlens 216 corresponding to each pixel to thereby provide a wide visual angle. In the device referred to above, since diagonally traveling light is cut off when the incident light is substantially parallelized, a great reduction in the quantity of light is developed and this device is also affected by the reflection of external light when the light is diffused by microlens 216. Further, a technique is required with which microlens 216 is formed for each pixel.

Further, Japanese Patent Laid-Open No. 299943/87 discloses a seventh prior art in which, as shown in FIG. 8, an illuminating device employed in a transmissive LCD comprising the illuminating device, transmissive liquid crystal panel 311 and lenticular 309 in successive order, is constructed of aperture type fluorescent tube 301a, cylindrical lens 301b, a plurality of semipermeable mirrors 317-1 through 317-4, total reflecting mirror 318 and box 319, and light entering liquid crystal panel 311 is set as quasi-parallel light. In this case, the respective semipermeable mirrors 317-1 through 317-4 are different in reflectance and transmittance to each other and are manufactured by a method of controlling deposition film thickness or a method of forming minute patterns by etching after all of the reflecting mirrors were produced. However, this method is apt to develop stripes at the image.

As described above, the conventional normally white type transmissive LCD is accompanied by a drawback that, since the visual angle is narrow and gradation of the image changes due to variation in retardation as the direction of incident light deviates from the normal to the liquid crystal panel causing a reduction in contrast ratio, an image having a satisfactorily wide visual angle cannot be obtained.

On the other hand, the LCD is made thicker in the aforementioned first prior art and is unsuitable for a notebook-type personal computer. Further, the LCD has no function for reducing the diagonally traveling light deviated from the direction of the normal to the liquid crystal panel. The second prior art has a problem that when the diagonally traveling light is fully cut off using the light waveguide, the quantity of light is greatly reduced. Even if the color filters are used as the two layers so as to suppress the diagonally traveling light as seen in the case of the third prior art, a problem arises that the quantity of light is reduced due to the formation of the color filters as the two layers. Further, no advantageous effect can be brought about in the case of a stripe type color pixel array. Each of the fourth and fifth prior arts is accompanied by a problem that both a loss of light outgoing from the liquid crystal panel and the reflection of external light on the light diffusion side cannot be improved.

Further, the sixth prior art has a problem in that the quantity of light traveling in the diagonal direction is reduced at the collimator and difficulties are encountered in forming the microlenses every pixels.

Furthermore, the seventh prior art involves drawbacks that it is difficult to prevent the stripes from being developed on the image when the semipermeable films different in reflectance and transmittance to each other are formed in the box and also a problem of mechanical strength arises.

SUMMARY OF THE INVENTION

It is an object of the present invention to provide a transmissive LCD capable of avoiding reductions in both the quantity of light and contrast ratio, and providing an image having a wide visual angle with an excellent gradation characteristic.

In order to achieve the above object, a transmissive LCD of the present invention comprises:

a surface illuminant;

a single prism lens film for receiving light emitted from the surface illuminant so as to be condensed in a direction perpendicular to a surface thereof and transmitting the resultant parallel light therethrough;

a TN liquid crystal panel for receiving the parallel light transmitted through the prism lens film and emitting a single wave lens film disposed in front of the TN liquid crystal panel and having both a surface facing the TN liquid crystal panel, which is shaped in the form of a wave having parallel ridgelines and a smooth surface on the opposite side, which is coated with a multilayer film, the wave lens film transmitting the light incident from the TN liquid crystal panel to the outside via said multilayer film as diffusion light.

According to one aspect of the present invention, a second wave lens film identical in structure to the wave lens film is provided in front of the wave lens film and the two wave lens films are disposed so that their directions of ridgelines are inclined 90° to each other.

According to another aspect of the present invention, in addition to the construction of the aforementioned aspect, a second prism lens film parallel to the prism lens film and having structure similar to that of the prism lens film is provided between the prism lens film and a TN liquid crystal panel and the two prism lens films are disposed so that their directions of ridgelines are inclined 90° to each other.

According to further another aspect of the present invention, in addition to the respective constructions referred to above, both surfaces of a TN liquid crystal panel and a wave lens film, which are opposed to each other, are coated with multilayer films respectively. Alternatively, a louver film provided between the prism lens film and the TN liquid crystal panel and having a number of opaque and minute louvers incorporated therein so as to be parallel to each other and orthogonal to the surface of the louver film, is disposed so that the surface of the louver film is perpendicular to the parallel light and the direction of the louvers incorporated into the louver film is perpendicular to a direction having a dependence on a visual angle.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a fragmentary perspective view illustrating a second embodiment of the present invention;

FIG. 12 is a fragmentary perspective view showing a third embodiment of the present invention;

FIG. 13 is a fragmentary cross-sectional view depicting a fourth embodiment of the present invention.

DETAILED DESCRIPTION OF THE PREFERRED EMBODIMENTS

Preferred embodiments of the present invention will hereinafter be described with reference to the accompanying drawings.

Figure 1:
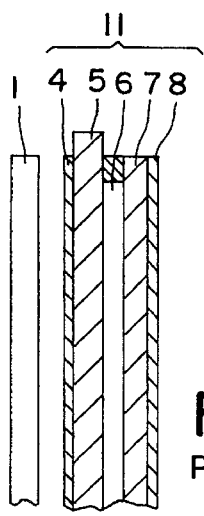
FIG. 1 is a fragmentary cross-sectional view showing one example of a conventional transmissive LCD.
Figure 2:
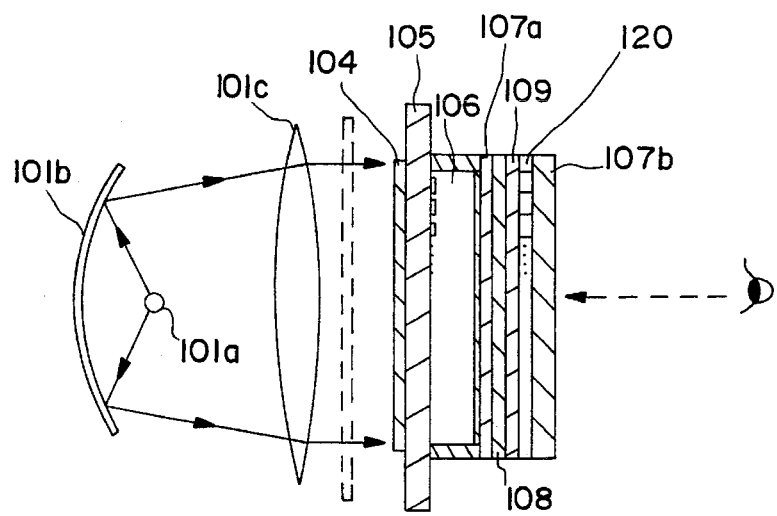
FIG. 2 is a cross-sectional view illustrating the structure of a first prior art of the present invention.
Figure 3:
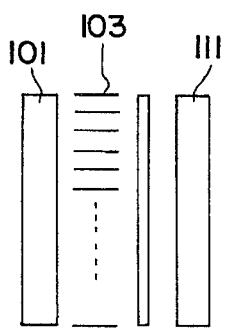
FIG. 3 is a cross-sectional view depicting the structure of a second prior art of the present invention.
Figure 4A:
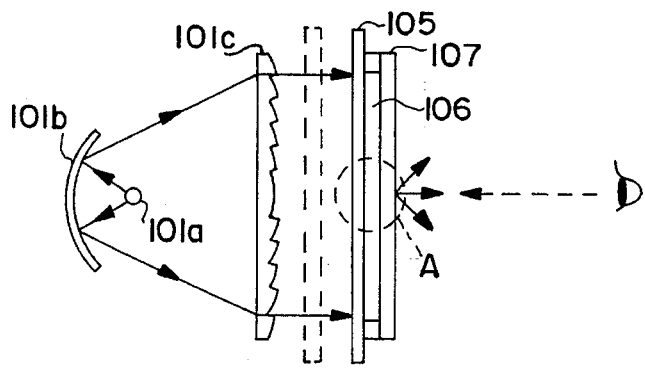
FIGS. 4(a) and 4(b) are respectively a cross-sectional view showing the structure of a third prior art of the present invention and a partially enlarged cross-sectional view of a portion A of the third prior art.
Figure 4B:
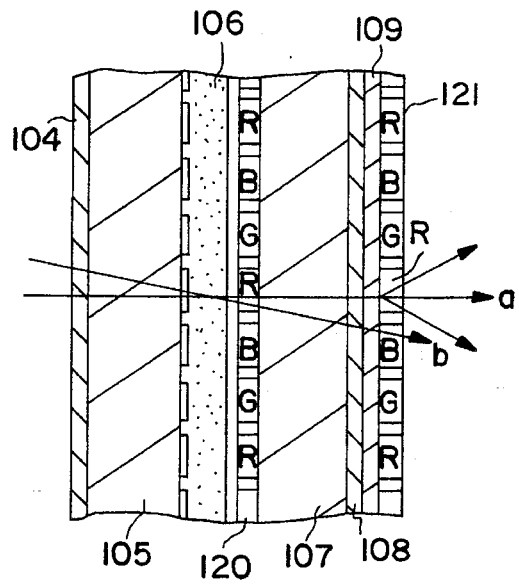
Figure 5:
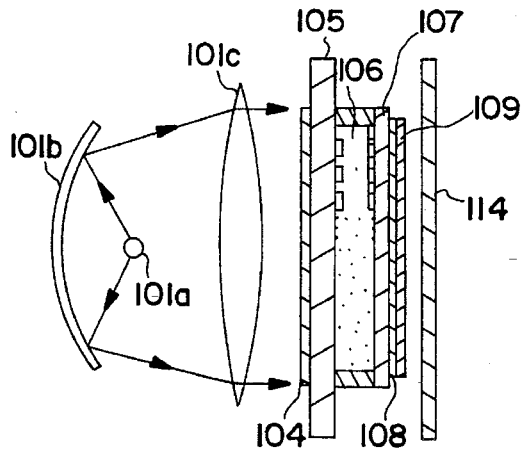
FIG. 5 is a cross-sectional view illustrating the structure of a fourth prior art of the present invention.
Figure 6:
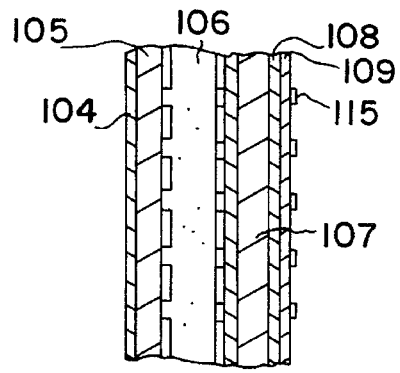
FIG. 6 is a fragmentary cross-sectional view showing the structure of a fifth prior art of the present invention.
Figure 7:
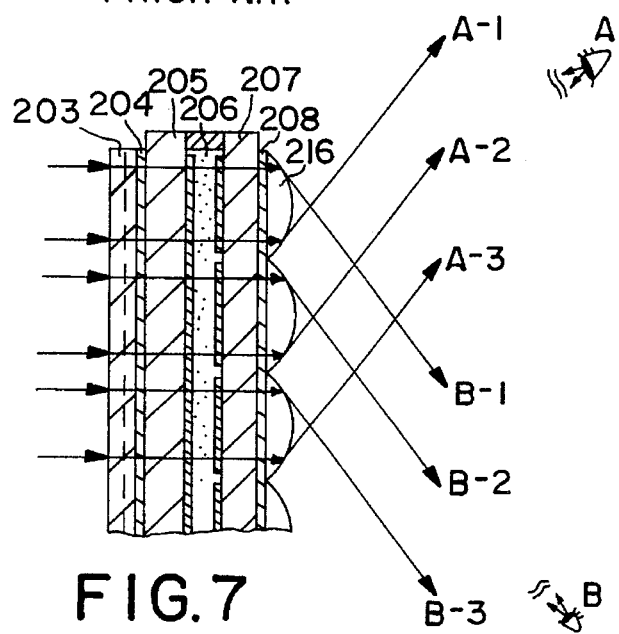
FIG. 7 is a fragmentary cross-sectional view depicting the structure of a sixth prior art of the present invention.
Figure 8:
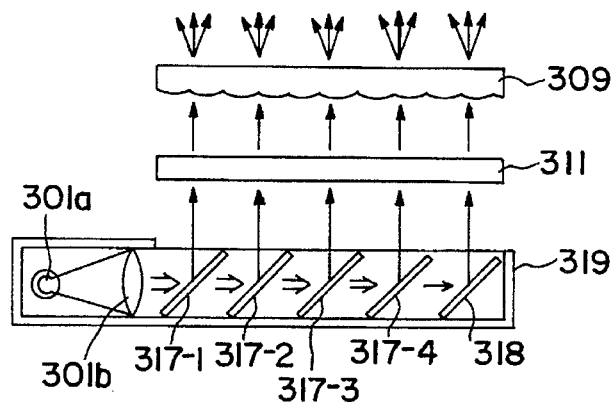
FIG. 8 is a cross-sectional view showing the structure of a seventh prior art of the present invention.
Figure 9A:
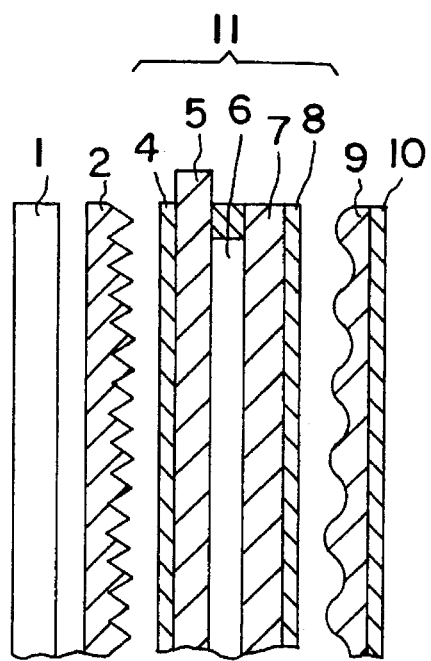
FIGS. 9(a) and 9(b) are respectively a fragmentary cross-sectional view showing a first embodiment of the present invention and a graph illustrating directivity of the first embodiment.
Figure 9B:
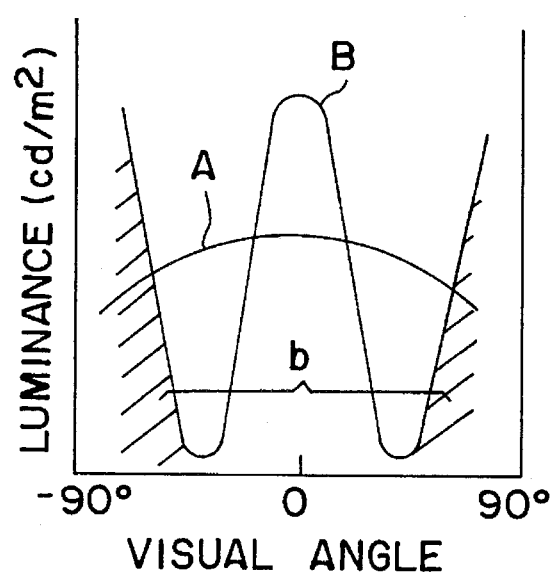

FIGS. 9(a) and 9(b) are respectively a fragmentary cross-sectional view showing a first embodiment of the present invention and a graph illustrating directional properties of the first embodiment. As shown in FIG. 9(a), the present embodiment comprises surface illuminant 1, prism lens film 2, liquid crystal panel 11 and wave lens film 9 having an outer surface coated with multilayer film 10, all of which are successively arranged along the traveling direction of light. Prism lens film 2 is made of plastics such as polycarbonate, acrylics or the like and is formed by a lens array film having one side surface with parallel prisms formed thereon and the opposite surface finished in smooth form. Operation and an effect of prism lens film 2 are that diffuse light is concentrated in the vertical direction of prism lens film 2. The vertical angle of each prism is of 90° which provides excellent condensing action and the pitch of the prism ranges from 30 µm to 360 µm. Wave lens film 9 is made of plastics such as polycarbonate, acrylics or the like and is formed by a lens array film having one side surface forming a waved quadrics so that directions of its ridgelines extend in parallel with each other and an outer surface opposite to the one side surface, which is finished in smooth form and coated with multilayer film 10. Operation and an effect are that condensing light is refracted and diffused by wavy surfaces and multilayer film 10 prevents external light from being reflected. The ratio of width of each wave to its pitch ranges from 0.04:1 to 1.5:1 and its pitch ranges from 30 µm to 360 µm. Liquid crystal panel 11 comprises active matrix substrate 5 formed with a signal electrode, a scanning electrode, TFTs and pixels thereon, color filter substrate 7 formed with a transparent common electrode and a color filter thereon, TN liquid crystal 6 impregnated between both substrates 5 and 7, and polarizing plates 4 and 8 disposed on the outer surfaces of both substrates 5 and 7, respectively, with their axes of polarization inclined 90° to each other.

Operation of the first embodiment will now be described below. As shown in FIG. 9(b), light emitted from surface illuminant 1 shows a gradually varying property free of directivity as indicated by curve A where the distribution of luminance of the emitted light is represented with respect to a visual angle as seen in the vertical direction. When the emitted light is transmitted through liquid crystal panel 11, a difference in retardation occurs depending on the visual angle so that the visual angle is narrowed. Therefore, prism lens film 2 is provided in front of surface illuminant 1. Since, oblique light is refracted in the direction of the normal to liquid crystal panel 11 owing to the refractive effect of the prism surfaces of prism lens film 2, the emitted light shows a sharp directional property as indicated by curve B. The light having the sharp directivity which has passed through liquid crystal panel 11, enters wave lens film 9 so as to be refracted and diffused by the wavy surface. Since light free of a variation in retardation is increased and diffused at this time, a representation in wide visual angle, in which a dependence on the visual angle is restrained, can be obtained. Further, since multilayer film 10 prevents the external light from being reflected, the screen is not turned white and an image, which is high in contrast ratio and satisfactory in quality, can be obtained.

Figure 10:
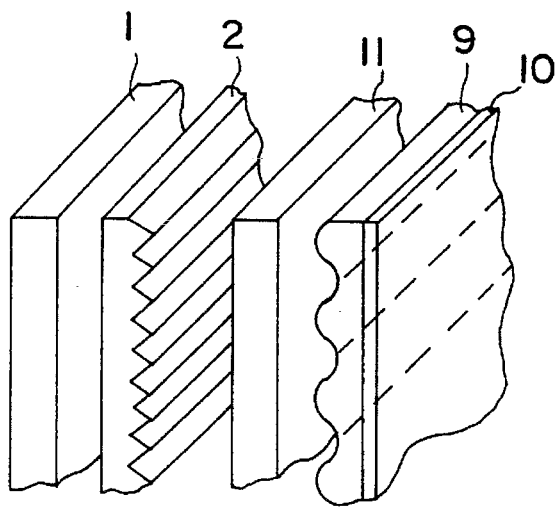
FIG. 10 is a perspective view showing the first embodiment shown in FIG. 9(a)

FIG. 10 is a perspective view of FIG. 9(a). Through the dependence on the visual angle of the TN liquid crystal panel differs according to the rubbing direction of liquid-crystal molecules, it is not so much in the left and right direction. The above dependence is highly developed in the upward and downward directions or vertical direction. Thus, the dependence on the visual angle in the vertical direction can be eliminated by setting the directions of the ridgelines of prism lens film 2 and wave lens film 9 so as to meet at a right angle to the vertical direction having the dependence on the visual angle as shown in FIG. 10.

FIG. 11 is a fragmentary perspective view showing a second embodiment of the present invention. As shown in FIG. 11, the present embodiment is a modification in which the setting of wave lens film 9 on the diffusion side has been changed in the first embodiment shown in FIGS. 9(a) and 10. Two wave lens films 9a and 9b respectively coated with multilayer films 10a and 10b are disposed with their directions of ridgelines inclined 90° to each other as an alternative to wave lens film 9 coated with multilayer film 10. Further, since their directions of ridgelines are set so as to be inclined 45° with respect to the vertical direction which depends on the visual angle, the visual angle can be widened owing to more gradually varying light diffusion.

FIG. 12 is a fragmentary perspective view showing a third embodiment of the present invention. As shown in FIG. 12, the present embodiment is a modification in which the setting of prism lens film 2 on the condensing side has been changed in the second embodiment shown in FIG. 11. As an alternative to prism lens film 2, two prism lens films 2a and 2b are disposed so that their directions of ridgelines are inclined 90° to each other. Further, since their directions of ridgelines are set so as to be inclined 45° with respect to the vertical direction which has the dependence on the visual angle, light-condensing power increases and a variation in retardation are reduced.

Figure 15:
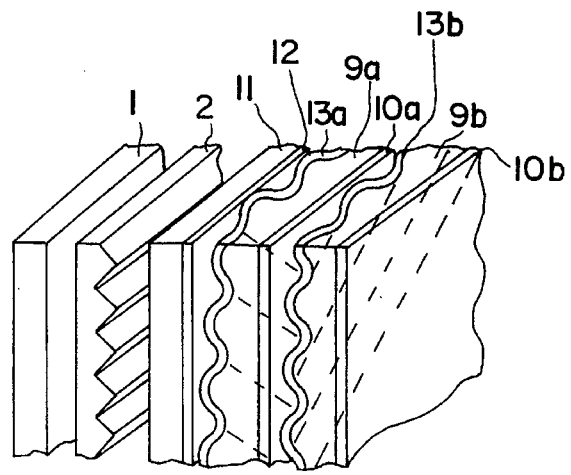
FIG. 15 is a perspective view showing an embodiment according to claim 6.
Figure 16:
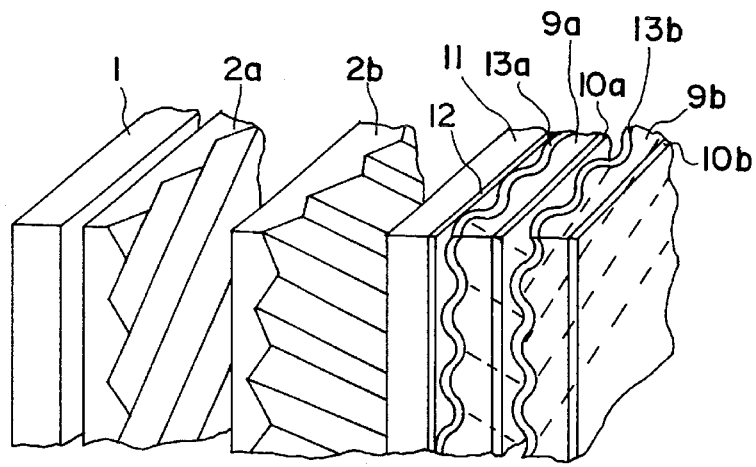
FIG. 16 is a perspective view showing an embodiment according to claim 8.

FIG. 13 is a fragmentary cross-sectional view showing a fourth embodiment of the present invention. As shown in FIG. 13, the present embodiment is a modification in which the external light is further restrained from being reflected in the first embodiment shown in FIGS. 9(a) and 10. Since any processing is effected on the wavy surface of wave lens film 9 in the first embodiment, the external light incident from the outside due to a difference in the refractive index of the wavy surface with respect to the air is reflected from the wavy surface and passes through multilayer film 10 so as to leak out. Thus, in order to make up for such a disadvantage, the wavy surface of wave lens film 9 and the surface of polarizing plate 8 of liquid crystal panel 11, which is opposed to its wavy surface, are respectively coated with multilayer film 13 and multilayer film 12 in the present embodiment. By coating both surfaces with such multilayer films 12 and 13 respectively, the reflection of the light from the wavy surface and the reflection of the light from the interface between polarizing plate 8 and the air can be reduced. The same effect as that obtained in the present embodiment can be obtained where the coating of the surfaces with the multilayer films 12 and 13 is applied to each of the second and third embodiments as shown in FIGS. 15 and 16, respectively.

Figure 14A:
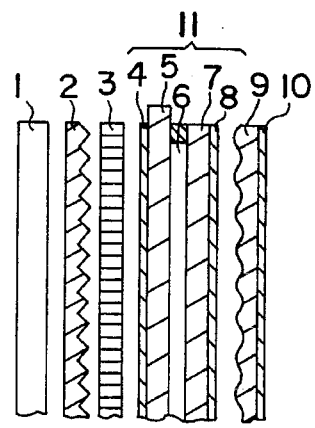
FIGS. 14(a) and 14(b) are respectively a fragmentary cross-sectional view and a perspective view showing a fifth embodiment of the present invention.
Figure 14B:
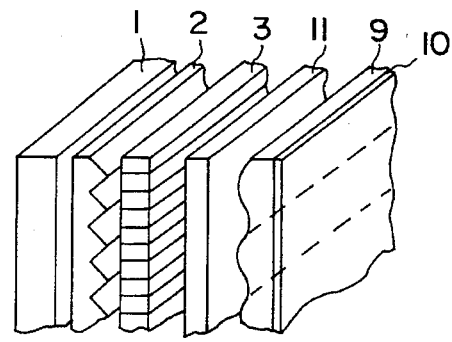
Figure 14C:
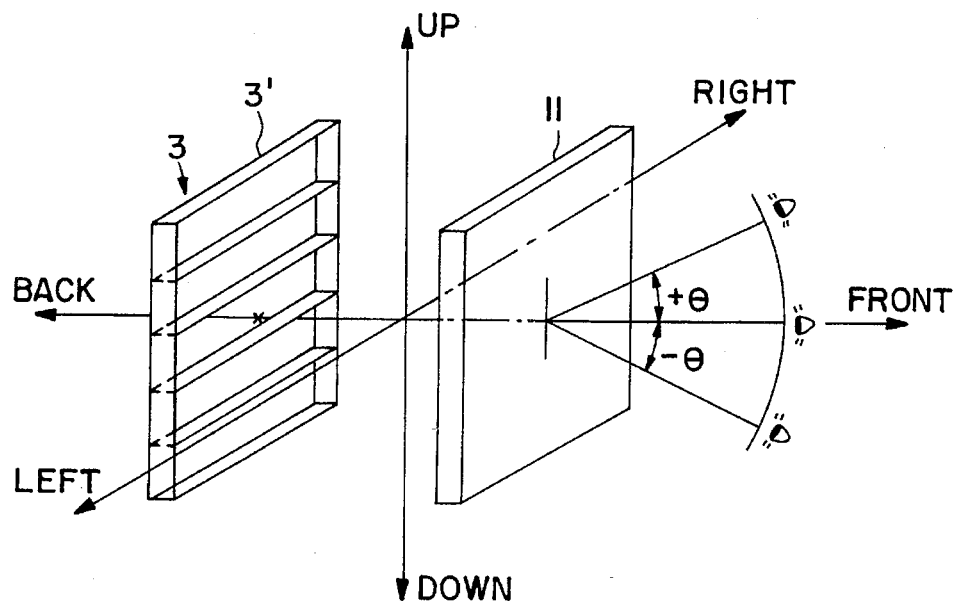
FIG. 14(c) shows the arrangement of the louver film provided in back of the liquid crystal panel in the fifth embodiment of the present invention.

FIGS. 14(a) and 14(b) are respectively a fragmentary cross-sectional view showing a fifth embodiment of the present invention and a perspective view illustrating the fifth embodiment. As shown in FIGS. 14(a) and 14(b), and 14(c) the present embodiment is constructed in such a manner that louver film 3 is provided in back of liquid crystal panel 11 in the first embodiment shown in FIG. 9(a). Louver film 3 is made of thin plate-like plastic and is constructed in such a manner that a number of opaque, black and fine louvers after louvers (collectively referred to by reference numeral 3') are incorporated therein in parallel to each other at right angles to the surface of louver film 3. In the first embodiment, the light transmitted through prism lens film 2 shown in FIG. 9(a) has the directional property having the sharp directivity indicated by curve B in FIG. 9(b), whereas when light falls on the prism surface of prism lens film 2 at angles greater than the critical angle, the light is totally reflected so as to greatly deviate in the diagonal direction. This light corresponds to light in the range indicated by the diagonally shaded areas b in FIG. 9(b), where light is brought to the total reflection. This can be confirmed by calculating the light-beam locus. In the present embodiment, all the light indicated by diagonally shaded area b, which enters liquid crystal panel 11 can be controlled so as to be fully cut off by providing louver film 3 in front of prism lens film 2. At this time, the directions of incorporated louvers are set so as to be orthogonal to the vertical direction in which the representation depends on the visual angle ±Θ. Thus, since light substantially free of the variation in retardation enters liquid crystal panel 11 and is diffused by wave lens film 9, a representation having a wide visual angle, in which the dependence on the visual angle is further reduced as compared with the first embodiment, can be obtained.

Figure 17A:
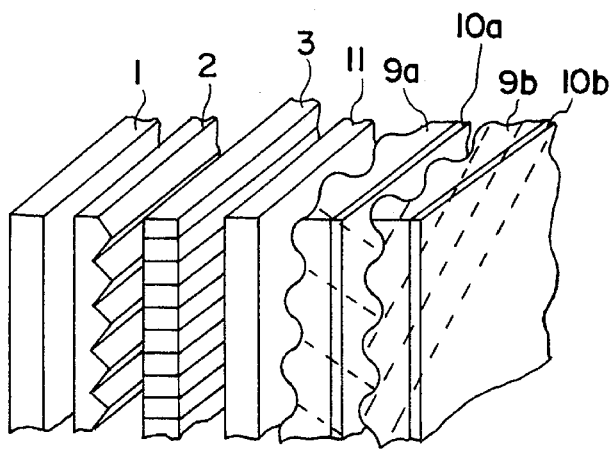
FIG. 17(a) is a perspective view showing an embodiment according to claim 7.
Figure 17B:
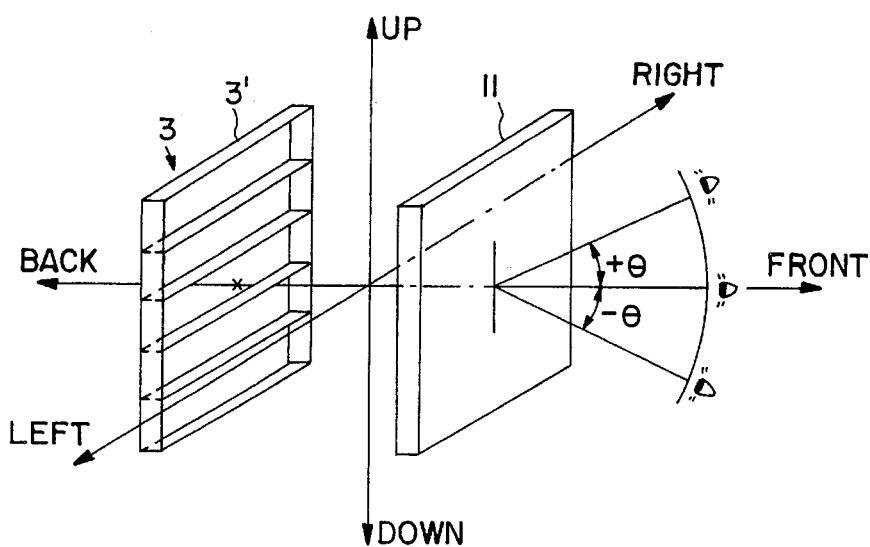
FIG. 17(b) shows the arrangement of the louver film provided in back of the liquid crystal panel of the embodiment according to claim 7.
Figure 18A:
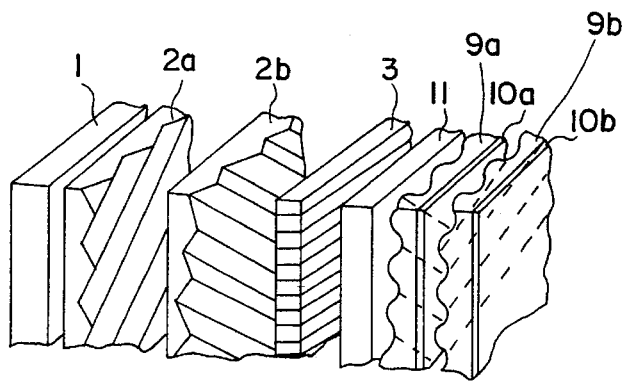
FIG. 18(a) is a perspective view showing an embodiment according to claim 9.
Figure 18B:
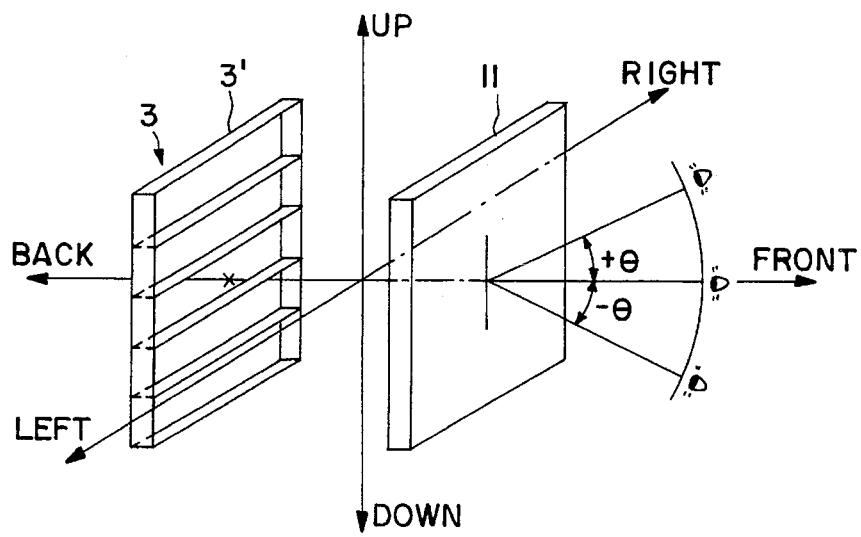
FIG. 18(b) shows the arrangement of the louver film provided in back of the liquid crystal panel of the embodiment according to claim 9.
Figure 19A:
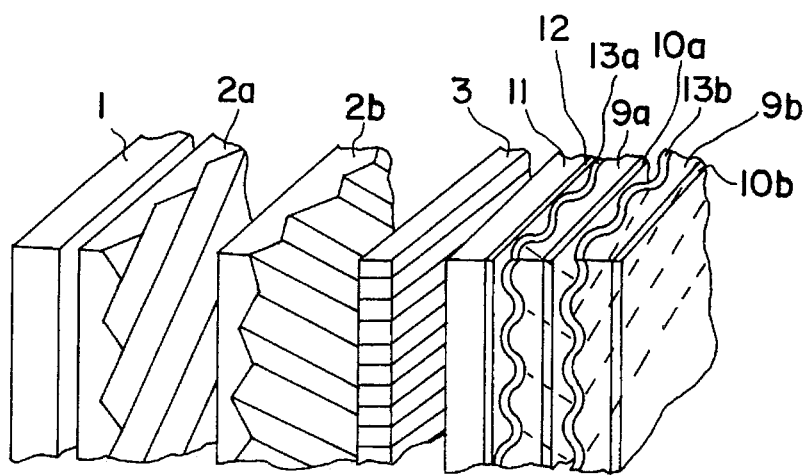
FIG. 19(a) is a perspective view showing an embodiment according to claim 10.
Figure 19B:
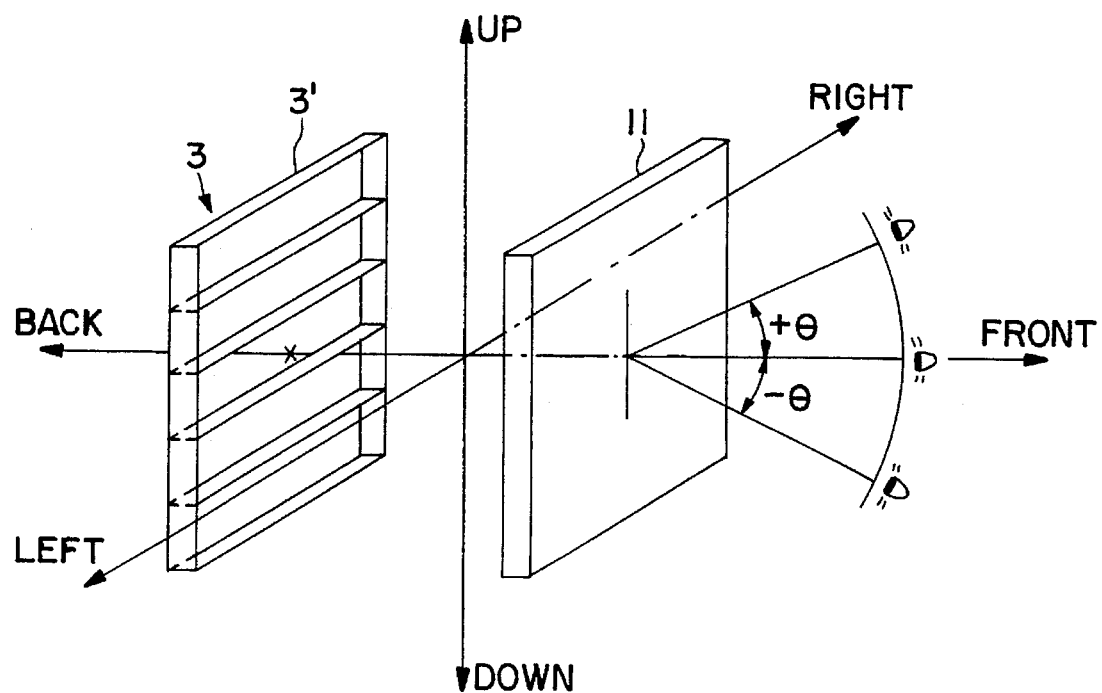
FIG. 19(b) shows the arrangement of the louver film provided in back of the liquid crystal panel of the embodiment according to claim 10.

Even in the case of the second and third embodiments, a wide visual-angle representation having less reduced dependence on the visual angle can be obtained by disposing louver film 3 behind liquid crystal panel 11 in a manner similar to the fifth embodiment as shown in FIGS. 17(a), 18(a) and 18(b), respectively. FIG. 19(a) and 19(b) also shows another embodiment provided with louver film 3 in that shown in FIG. 16.

According to the transmissive LCD of the present invention as described above, the prism lens film is provided between the surface light source and the liquid crystal panel so that the light traveling in the diagonal 10 direction is focused in the direction of the normal to the liquid crystal panel. Further, the focused light is substantially made parallel by using the louvers. As a result, a great reduction in the quantity of light can be controlled and the light in the diagonal direction can be completely cut off. The light transmitted through the liquid crystal panel can be reduced in loss and diffused by being allowed to pass through the wave lens film coated with the multilayer film. Further, the external light can be restrained from reflection. As a result, the transmissive liquid crystal display can be made thinner and further, tone reversal as seen from 10° in the downward direction, which has been developed due to the variation in retardation, is no longer developed in the downward direction. A visual angle at which the contrast ratio is more than or equal to 10, reaches ±70° or more as seen in the vertical direction though the conventional visual angle was 20° as seen in the upward direction and 50° as seen in the downward direction, thus making it possible to obtain an image having a wide visual angle free of the dependence on the visual angle.

Although certain preferred embodiments of the present invention have been shown and described in detail, it should be understood that various changes and modifications may be made therein without departing from the scope of the appended claims.

What is claimed is:

1. A transmissive liquid crystal display comprising:

a surface illuminant including a light-guide plate;

a single prism lens film having an uniform apical angle for receiving light emitted from said surface illuminant so as to be condensed in a direction perpendicular to a surface thereof and transmitting the resultant parallel light therethrough;

a TN liquid crystal panel for receiving the parallel light transmitted through said prism lens film and emitting light for representing an image therefrom; and a single wave lens film disposed in front of said TN liquid crystal panel and having a surface facing said TN liquid crystal panel, which is shaped in the form of a wave having parallel ridgelines and a smooth surface on the opposite side, which is coated with a multilayer film, said wave lens film transmitting the light incident from said TN liquid crystal panel to the outside via said multilayer film as diffusion light.

2. The transmissive liquid crystal display as claimed in claim 1, wherein a second wave lens film having a structure similar to that of said wave lens film is provided in front of said wave lens film and said two wave lens films are disposed so that their directions of ridgelines are inclined 90° to each other.

3. The transmissive liquid crystal display as claimed in claim 2, wherein a second prism lens film parallel to said prism lens film and having a structure similar to that of said prism lens film is provided between said prism lens film and said TN liquid crystal panel and said two prism lens films are disposed so that their directions of ridgelines are inclined 90° to each other.

4. The transmissive liquid crystal display as claimed in claim 3, wherein the surface of said TN liquid crystal panel facing to one of said wave lens films and each wavy surface of said wave lens films are coated with multilayer films, respectively.

5. The transmissive liquid crystal display as claimed in claim 4, wherein a louver film provided between said prism lens film and said TN crystal panel and having a number of opaque louvers incorporated therein so as to be parallel to each other and orthogonal to the surface of said louver film, is disposed so that the surface of said louver film is perpendicular to said parallel light and the direction of said louvers incorporated into said louver film is perpendicular to line of sight in which image quality is lessened.

6. The transmissive liquid crystal display as claimed in claim 3, wherein a louver film provided between said prism lens film and said TN liquid crystal panel and having a number of opaque louvers incorporated therein so as to be parallel to each other and orthogonal to the surface of said louver film, is disposed so that the surface of said louver film is perpendicular to said parallel light and the direction of said louvers incorporated into said louver film is perpendicular to line of sight in which image quality is lessened.

7. The transmissive liquid crystal display as claimed in claim 2, wherein the surface of said TN liquid crystal panel facing to one of said wave lens films and each wavy surface of said wave lens films are coated with multilayer films, respectively.

8. The transmissive liquid crystal display as claimed in claim 2 wherein a louver film provided between said prism lens film and said TN liquid crystal panel and having a number of opaque louvers incorporated therein so as to be parallel to each other and orthogonal to the surface of said louver film, is disposed so that the surface of said louver film is perpendicular to said parallel light and the direction of said louvers incorporated into said louver film is perpendicular to a line of sight in which image quality is lessened.

9. The transmissive liquid crystal display as claimed in claim 1, wherein the surface of said TN liquid crystal panel facing to said wave lens film and the wavy surface of said wave lens film are coated with multilayer films, respectively.

10. The transmissive liquid crystal display as claimed in claim 1, wherein a louver film provided between said prism lens film and said TN liquid crystal panel and having a number of opaque louvers incorporated therein so as to be parallel to each other and orthogonal to the surface of said louver film, is disposed so that the surface of said louver film is perpendicular to said parallel light and the direction of said louvers incorporated into said louver film is perpendicular to a line of sight in which image quality is lessened.

11. The transmissive liquid crystal display as claimed in claim 10, wherein at said line of sight gray-scale inversion appears.

12. The transmissive liquid crystal display as claimed in claim 10, wherein at said line of sight tone inversion appears.

* * * * *

UNITED STATES PATENT AND TRADEMARK OFFICE
CERTIFICATE OF CORRECTION

PATENT NO. : 5,557,433
DATED : September 17, 1996
INVENTOR(S) : Muneo Maruyama; Toshihiko Ueno; Hiroshi Hada; Masatake Babe It is certified that error appears in the above-indentified patent and that said Letters Patent is hereby corrected as shown below:

Title page, in the Assignee, Item [73], "France" should be --Japan--

Signed and Sealed this

Eleventh Day of February, 1997

Attest:

BRUCE LEHMAN

*Attesting Officer*     *Commissioner of Patents and Trademarks*